(12) United States Patent
Brown et al.

(10) Patent No.: US 12,544,021 B2
(45) Date of Patent: Feb. 10, 2026

(54) COLLAR DEVICE FOR MOUNTING WITH AN IMAGE RECEPTOR OF A MEDICAL IMAGING SYSTEM

(71) Applicant: MARKSMAN TARGETING, INC., San Diego, CA (US)

(72) Inventors: Roy Anthony Brown, San Diego, CA (US); Kellen Van Ausdal, San Diego, CA (US)

(73) Assignee: MARKSMAN TARGETING, INC., San Diego, CA (US)

( * ) Notice: Subject to any disclaimer, the term of this patent is extended or adjusted under 35 U.S.C. 154(b) by 249 days.

(21) Appl. No.: 17/269,491

(22) PCT Filed: Feb. 4, 2019

(86) PCT No.: PCT/US2019/016474
§ 371 (c)(1),
(2) Date: Feb. 18, 2021

(87) PCT Pub. No.: WO2020/162869
PCT Pub. Date: Aug. 13, 2020

(65) Prior Publication Data
US 2021/0345976 A1    Nov. 11, 2021

(51) Int. Cl.
| | | |
|---|---|---|
| A61B 6/00 | (2024.01) |
| A61B 6/04 | (2006.01) |
| A61B 6/08 | (2006.01) |
| A61B 6/10 | (2006.01) |
| A61B 6/42 | (2024.01) |
| A61B 90/00 | (2016.01) |
| A61B 90/13 | (2016.01) |
| A61B 90/25 | (2016.01) |
| A61B 90/50 | (2016.01) |

(52) U.S. Cl.
CPC ............... *A61B 6/08* (2013.01); *A61B 6/04* (2013.01); *A61B 6/105* (2013.01); *A61B 6/4225* (2013.01); *A61B 6/4441* (2013.01); *A61B 90/08* (2016.02); *A61B 90/13* (2016.02); *A61B 90/25* (2016.02); *A61B 90/50* (2016.02); *A61B 2090/3764* (2016.02); *A61B 2090/3937* (2016.02)

(58) Field of Classification Search
CPC .... A61B 2090/3764; A61B 2090/3937; A61B 2017/0092; A61B 6/04; A61B 6/08; A61B 6/105; A61B 6/12; A61B 6/4225; A61B 6/4441
See application file for complete search history.

(56) References Cited

U.S. PATENT DOCUMENTS

| | | | |
|---|---|---|---|
| 7,104,688 | B2 | 9/2006 | Kopping |
| 7,263,171 | B2 | 8/2007 | Shang |
| 8,768,437 | B2 | 7/2014 | Barrick |
| 2017/0296202 | A1* | 10/2017 | Brown .................. A61B 34/10 |
| 2017/0296273 | A9 | 10/2017 | Brown |

* cited by examiner

*Primary Examiner* — Dani Fox
(74) *Attorney, Agent, or Firm* — CP Law Group PC; Cy Bates (57) ABSTRACT

The disclosure concerns a collar device configured for attachment with an image receptor of an X-ray or similar imaging system, the collar device including a radiolucent bar and linear light source, the combination of which being used for patient positioning, identification of surgical entry point and trajectory guidance of instrumentation.

30 Claims, 10 Drawing Sheets

SECTION A-A

FIG.5
SECTION B-B

COLLAR DEVICE FOR MOUNTING WITH AN IMAGE RECEPTOR OF A MEDICAL IMAGING SYSTEM

BACKGROUND

Field of the Invention

This invention relates to medical imaging systems; and more particularly, to a collar device configured for attachment with an image receptor of an X-ray imaging system, the collar device being used to communicate angles and trajectories in connection with medical applications.

Description of the Related Art

Figure 1:
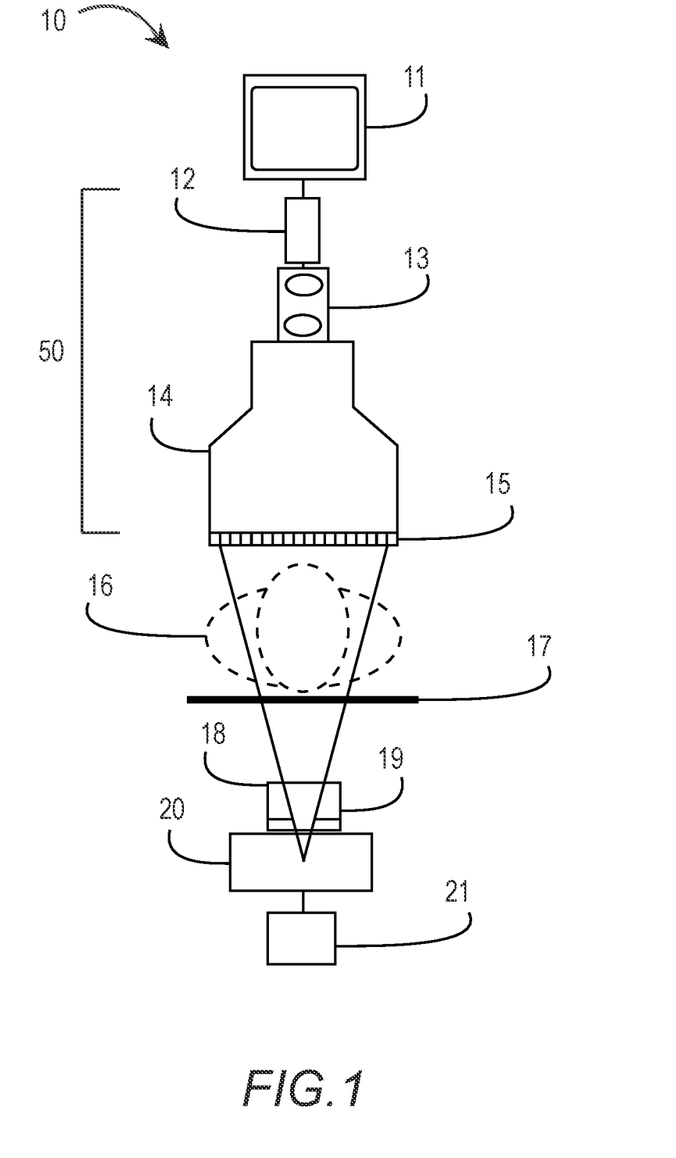
FIG. 1 is a plan view of a conventional medical imaging system with X-ray image intensifier configured for use with surgical applications involving a human or animal patients.

Conventional X-ray imaging systems used for medical applications, such as, for example, surgeries, generally include a monitor, image receptor, patient-table, collimator, X-ray tube, and X-ray generator. An example of a conventional X-ray imaging system is shown in FIG. 1. The image receptor may be provided as an X-ray image intensifier (XRII), or a flat panel detector (FPD). The system may comprise a C-arm for translating and orienting the imaging system at various angles of observance. Such systems can be used to guide physicians and other medical professionals during surgical operations.

A method for finding surgical access trajectories and associated distances and angles is described in commonly owned Pat. Pub. No. US 2017/0296273 ("the '273 Publication"), the contents of which is hereby incorporated by reference. To facilitate the methods described in the '273 Publication, and other useful methods, a collar device is provided as-described herein.

SUMMARY

A collar device is disclosed for use with a medical imaging system, such as X-ray imaging systems and the like.

The collar device is generally configured for mounting with an image receptor of an x-ray imaging system. The image receptor may comprise an X-ray image intensifier (XRII) or a flat panel detector (FPD).

In a preferred embodiment, the collar device may include: (i) a housing configured for mounting about the image receptor of the medical imaging system; (ii) a base coupled to the housing, the base including a channel extending along a periphery of the base; and (iii) a rotating assembly coupled to the base and configured to rotate about the channel. The rotating assembly is generally configured to further comprise: a radiolucent marker extending from a first end to a second end along at least a portion of a diameter of the rotating assembly, first and second fiducial markers each disposed at opposite sides of the collar device, a laser source assembly coupled to the rotating assembly and configured to project laser light within a laser light plane, or a combination thereof. The radiolucent marker, a virtual marker simulated from the first and second fiducial markers, or a combination thereof, is configured to be commonly disposed within the laser light plane of the laser source assembly. In this regard, the laser source assembly is adapted to provide a visual indicator, such as a laser-line, for visualizing a plane (a component of a surgical trajectory) for purposes including, but not limited to, aligning instruments and maintaining an intended surgical trajectory as a medical instrument is advanced during a medical procedure. The laser light plane is useful to guide physician decisions during the operation, while concurrently reducing radiation exposure attributed to multiple x-ray images that would otherwise be required.

These, and other features and aspects of the collar device are further described in the detailed description and the drawings appended hereto.

BRIEF DESCRIPTION OF THE DRAWINGS

These and other features and benefits will be appreciated by one with skill in the art upon a thorough review of the appended detailed descriptions and drawings, wherein.

DETAILED DESCRIPTION

In the following description, for purposes of explanation and not limitation, details and descriptions are set forth in order to provide a thorough understanding of the embodiments of the invention. However, it will be apparent to those skilled in the art that the present invention may be practiced in other embodiments, including certain variations or alternative combinations that depart from these details and descriptions.

General Embodiment

In a general embodiment, a collar device is configured for mounting with an image receptor of a medical imaging system in order to provide laser visualizations of angles and trajectories, and surgical guidance, related to various possible medical applications, such as, but not limited to, orthopedic and organ-based surgeries.

The collar device generally comprises: a base configured to couple with a portion of the medical imaging system, such as an image receptor (image intensifier or flat panel detector) or an X-ray tube; and a rotating assembly being rotatably coupled to the base. The rotating assembly further comprises at least two from the group consisting of: (i) a radiolucent marker extending from a first end to a second end along at least a portion of a diameter of the rotating assembly, (ii) first and second fiducial markers each disposed at opposite ends of the collar device, and (iii) a laser source assembly coupled to the rotating assembly and configured to project laser light within a laser light plane.

Where the collar device comprises a radiolucent marker and a laser source assembly, the radiolucent marker is commonly disposed within the laser light plane of the laser source assembly. It should be noted that the radiolucent marker is not required to extend along the entirety of a diameter of the rotating assembly, but may extend only a portion thereof. Multiple radiolucent markers may be implemented, with at least one of which being disposed within the laser light plane of the laser source assembly.

The collar device may comprise two or more laser source assemblies.

More particularly, the collar device for mounting with an image receptor of an X-ray imaging system may comprise: a housing configured for mounting about said image receptor; a base coupled to the housing, the base including a channel extending along a periphery of the base; and a rotating assembly coupled to the base and configured to rotate about the channel. The rotating assembly may further comprise: (i) a radiolucent marker extending from a first end to a second end along at least a portion of a diameter of the rotating assembly, (ii) first and second fiducial markers each disposed at opposite ends of the collar device, (iii) a laser source assembly coupled to the rotating assembly and configured to project laser light within a laser light plane, or (iv) a combination thereof.

The image receptor may comprise an X-ray image intensifier or a flat panel detector.

The collar device may further comprise a bezel, wherein at least one of: the bezel and the housing comprises indicia disposed about an exterior surface thereof.

The collar device may further comprise a bubble level assembly, the bubble level assembly being coupled to the housing.

The base may further comprise a plurality of first setscrews for adjusting an orientation of the collar device about a face of the image receptor.

The rotating assembly may further comprise one or more bearing assemblies, each of the bearing assemblies being disposed about a circumference of the rotating assembly and being configured to rotatably engage the channel of the base. Each of the bearing assemblies may individually comprise: a ball bearing screw, a washer, a bearing, and a bearing nut.

The rotating assembly may further comprise one or more brake assemblies, each of the one or more brake assemblies being independently configured to apply frictional resistance to an inner surface of the housing. Each of the brake assemblies may comprise: a brake receptacle, a brake, and one or more brake springs configured to extend between the brake receptacle and the brake for providing a bias-force therebetween.

The laser source assembly may comprise a laser source housing and a laser source disposed within the laser source housing. The laser source assembly can be further coupled to a battery assembly for receiving power.

The first end of the radiolucent marker can be coupled to the rotating assembly via an end rod holder. The second end of the radiolucent marker can be attached to the laser source assembly, or to a marker clip.

The collar device may further comprise a second radiolucent marker coupled to the rotating assembly. The second radiolucent marker can be configured at an angle with respect to the first radiolucent marker, wherein the angle comprises between 1° and 90° therebetween.

The collar device may further comprise a second laser source assembly coupled to the rotating assembly. The second laser source assembly may be configured to project laser light within a second laser light plane distinct from the other laser light plane. The second radiolucent marker can be configured in alignment with the second laser light plane.

The collar device may further comprise a third radiolucent marker, the third radiolucent marker coupled to the first radiolucent marker at a center thereof. The third radiolucent marker may comprise concentrically nested tubes configured for adjustable configuration toward a center of the rotating assembly. The third radiolucent marker may be attached to the first radiolucent marker (or the second radiolucent marker) by a base and ball bearing attached at the center point of first radiolucent marker (or second radiolucent marker, respectively). The third radiolucent marker may form a friction fit within the ball bearing base.

The collar device may further comprise a stationary arm attachment for securing a position of the collar system relative to a patient-mounted rod, a surgical instrument, or a combination thereof. In this regard, the collar device may comprise two or more stationary arm attachments.

The radiolucent marker may further comprise a center marker, wherein the center marker is disposed along the radiolucent marker at a center of the collar device.

The collar device may further comprise a plurality of light emitting diodes (LEDs) each disposed about a periphery of the collar device.

The collar device may further comprise a microscope mount for attaching a microscope (or visual inspection scope) to the collar device.

The collar device may further comprise a display screen mount for attaching a display screen to the collar device.

The collar device may further comprise a/v-componentry for communicating audio signals, visual signals, or a combination thereof.

Illustrated Embodiment

Now turning to the drawings, FIG. 1 shows a conventional medical imaging system 10 with X-ray image intensifier 14 configured for use with surgical applications involving a human or animal patients. One with skill in the art will recognize that a flat panel detector can be similarly implemented in place of the image intensifier. The term "image receptor" is used herein as a generic term intended to include both the image intensifier and the flat panel detector. The collar system as-described herein may be implemented with any image receptor. Referring to FIG. 1, going from top to bottom, the conventional medical imaging system comprises a monitor 11, video camera 12, optical coupling 13, image intensifier 14, and grid 15. The combination of the camera, optical coupling, and image intensifier collectively define an exemplary image receptor 50. Beneath the image intensifier is a table 17, and a patient 16 (human or animal) positioned on the table. Finally, an X-ray generator 21, X-ray tube 20, collimator 19, and filtration 18 are each disposed beneath the patient in the drawing. Note the X-ray tube and image intensifier in alignment for capturing images of the patient. Because the function of medical imaging systems is well known and appreciated in the art, details are not described herein.

Initially, it should be noted that the collar device described herein may be attached to the image receptor or the X-ray tube.

Figure 2:
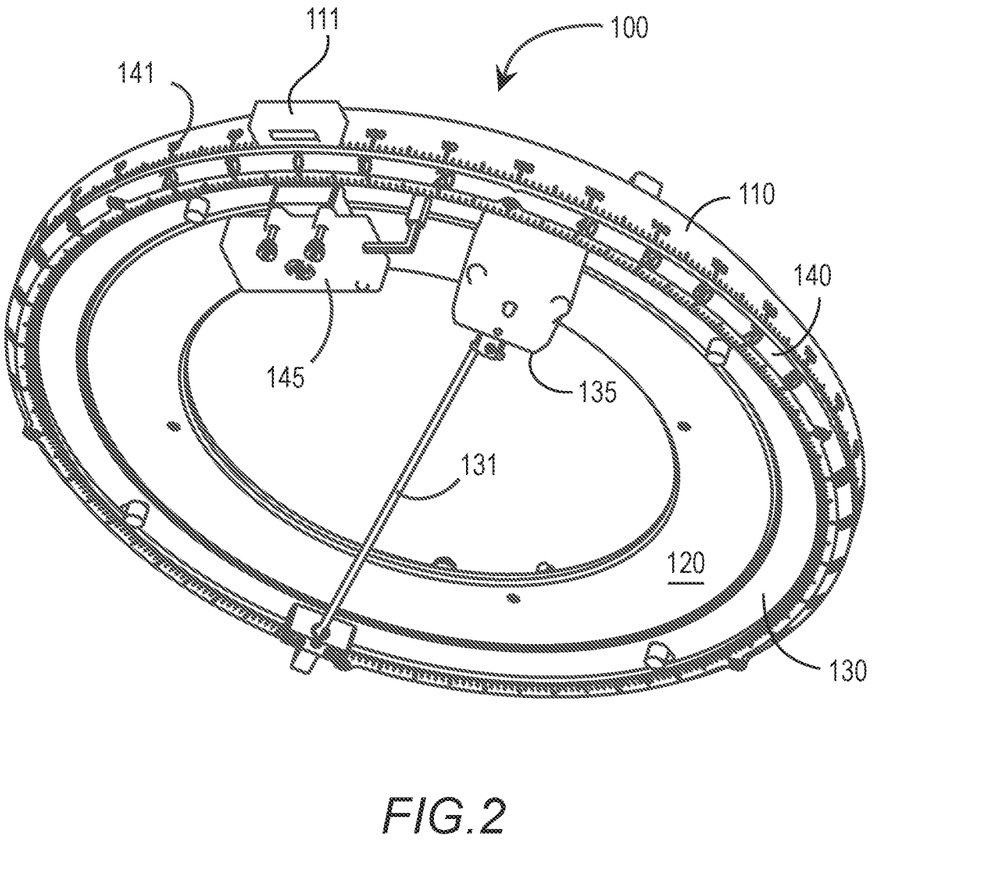
FIG. 2 is a perspective view of a collar device in accordance with an illustrated embodiment.

FIG. 2 shows a collar device 100 in accordance with the illustrated embodiment. The collar device is an assembly of various components, including: a housing 110, a base 120 coupled to the housing, a rotating assembly 130 configured to rotate about the base and housing, and a bezel 140. The housing, bezel, or both, may comprise indicia 141, such as degree markers or other information disposed on a surface thereof.

Coupled to the housing is a bubble level assembly 111. The bubble level assembly may be attached a side surface of the housing and configured to extend with a common plane of the collar device. The bubble level can be used to verify alignment of the collar device about the image receptor.

A radiolucent marker 131 is attached to the rotating assembly 130, and extends along at least a portion of a diameter thereof. In addition, a laser source assembly 135 adapted to provide a linear laser line within a laser plane is configured in alignment with the radiolucent marker. In this regard, the laser is adapted to provide visual light within the same plane as the superimposed image of the radiolucent marker as viewed form the image receptor. Thus, each of the radiolucent marker and the linear laser light are aligned in a common plane. This enables a physician to appreciate the positioning of surgical instruments, alignment of surgical instruments, and can provide guidance during a translation of a surgical instrument during a procedure.

Figure 3:
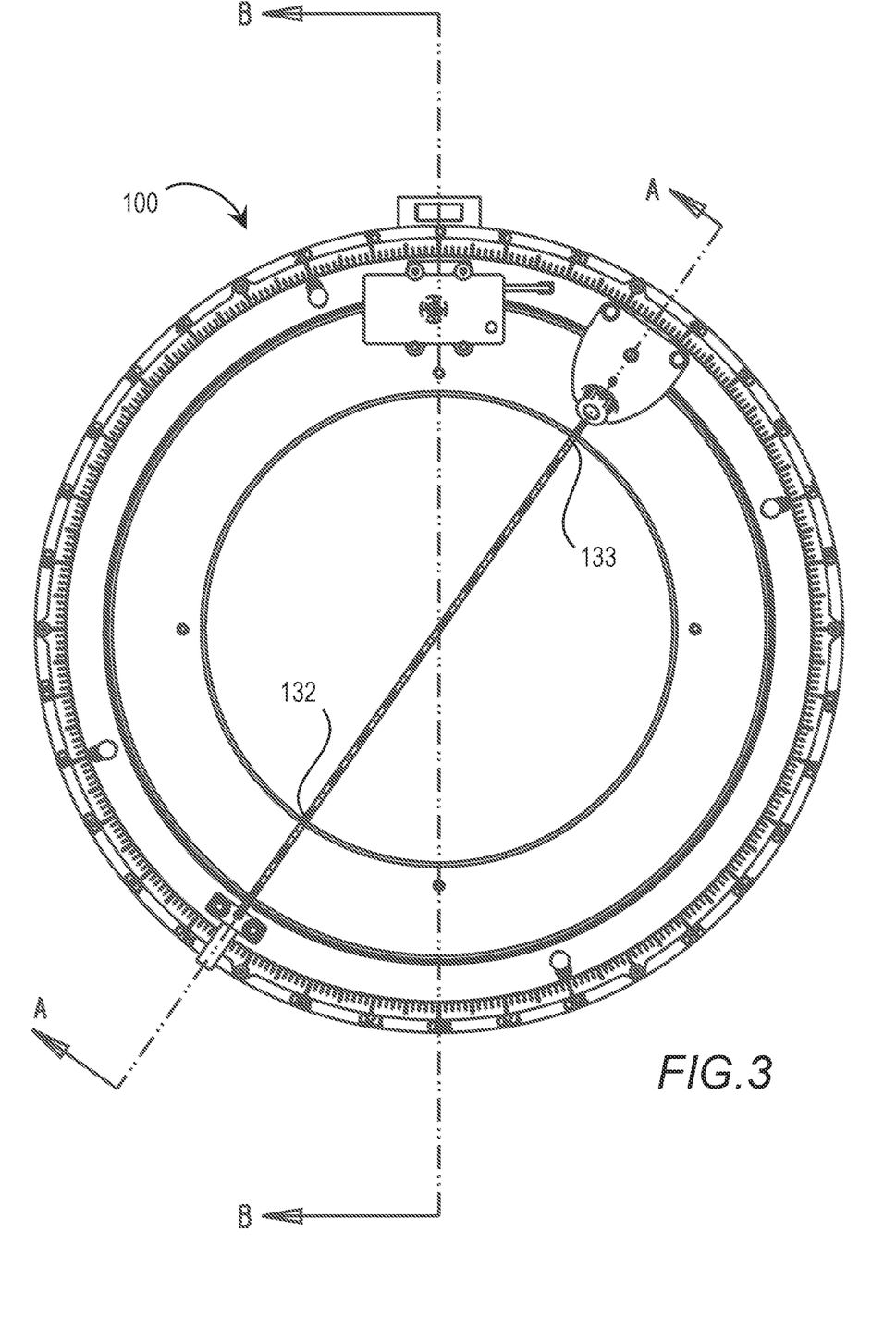
FIG. 3 is plan view of first side of the collar device.

FIG. 3 shows a first side of the collar device 100. Because "front" and "rear" are relative terms, and C-arm medical imaging systems are rotated in all directions during use, we will refer to the instant side of the collar device being illustrated as the "first side". Here, two lines indicate sections which will be later referred, including: section A-A and section B-B. In addition, the radiolucent marker is shown extending form a first end 132 to a second end 133 along at least a portion of the diameter of the rotating assembly (here it actually extends the entire diameter).

Figure 4:
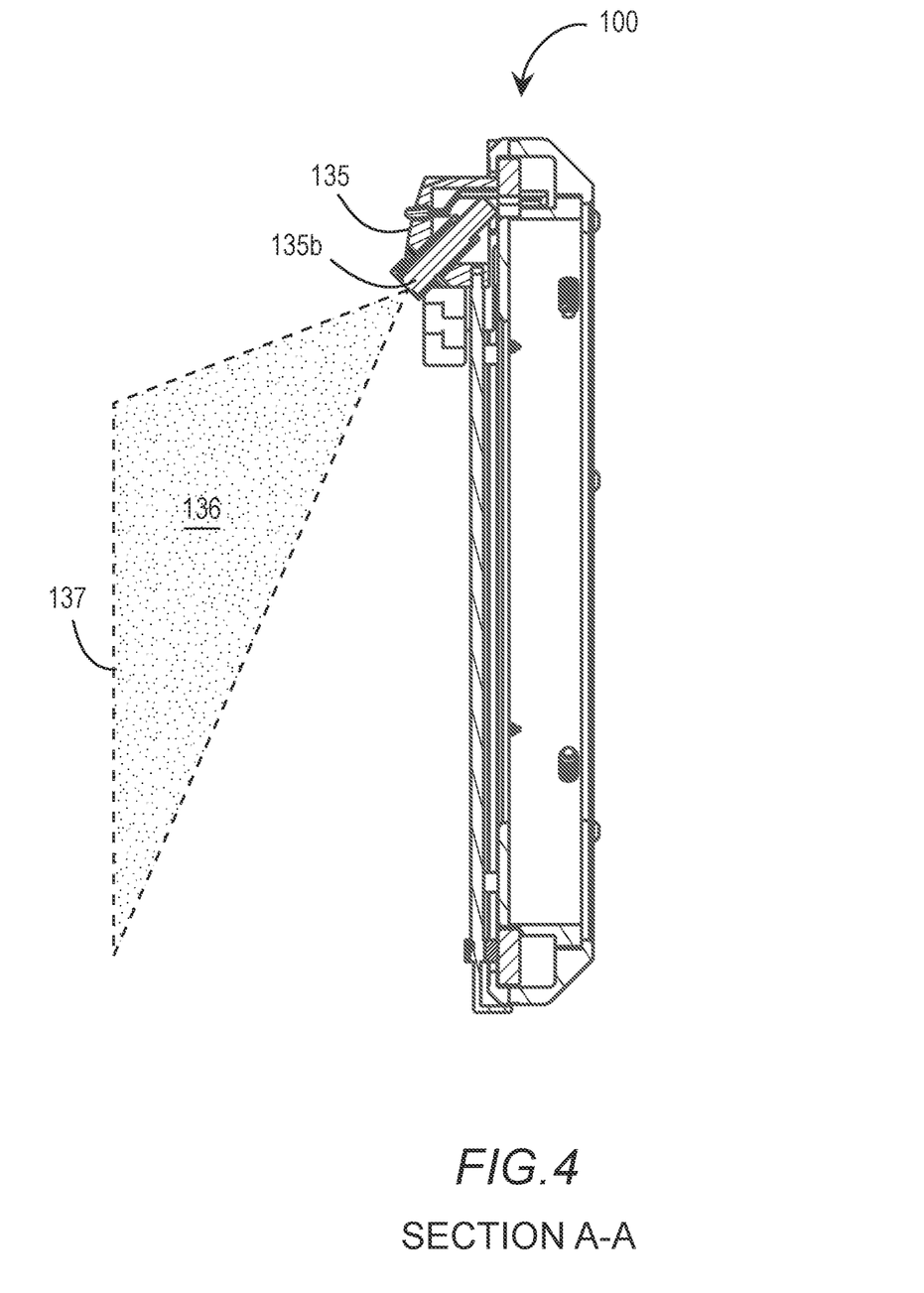
FIG. 4 is a first section view of the collar device, the first section view is taken from the section A-A as-labeled in FIG. 3.

FIG. 4 shows a first section view of the collar device 100, the first section view being taken from the section A-A as-labeled in FIG. 3. From this view, one can appreciate the laser source assembly 135 and laser source 135b. The laser source is configured to provide linear laser light 136 within a laser light plane 137. On the patient will be viewed a laser line, which is in alignment with a superimposed image of the radiolucent marker if viewed through the imaging system.

Figure 5:
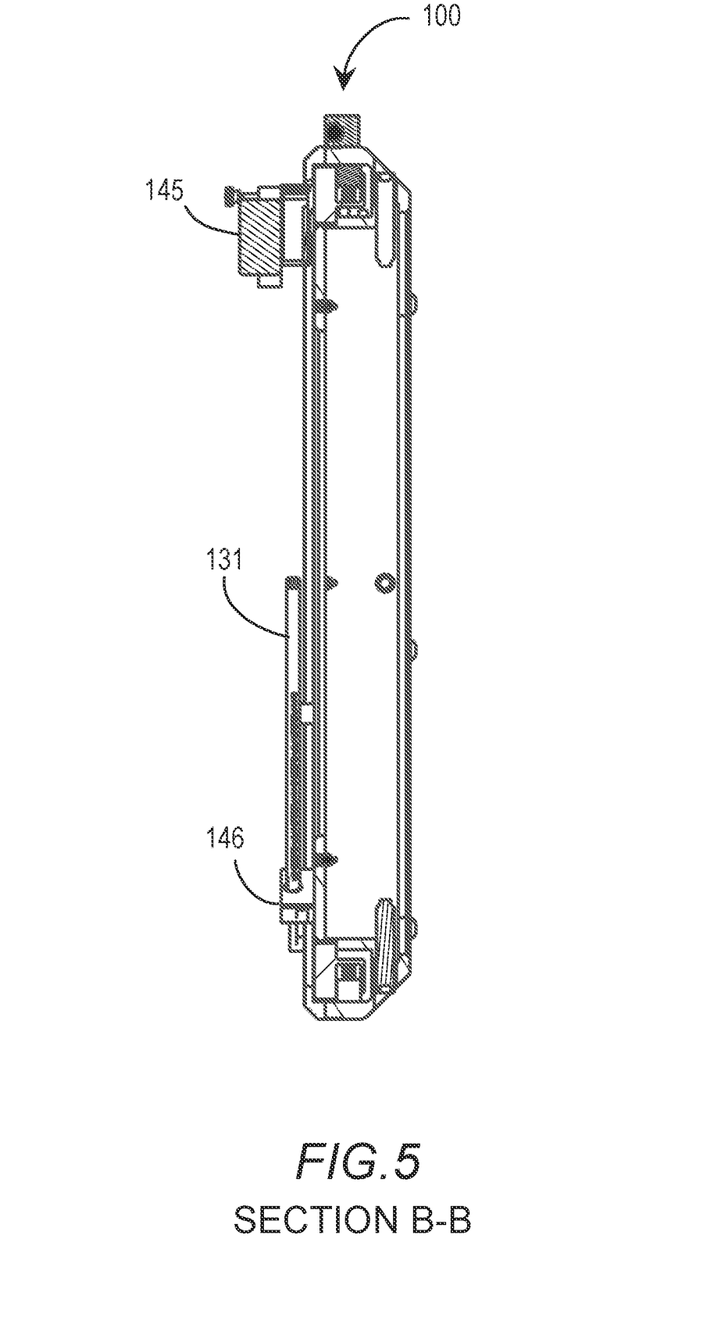
FIG. 5 is a second section view of the collar device, the second section view is taken from the section B-B as-labeled in FIG. 3.

FIG. 5 shows a second section view of the collar device 100, the second section view being taken from the section B-B as-labeled in FIG. 3. From this view one can appreciate the arrangement of components such as the battery assembly 145, radiolucent marker 131 and end rod holder 146. The end rod holder is provided to attach the radiolucent marker to the rotating assembly.

Figure 6:
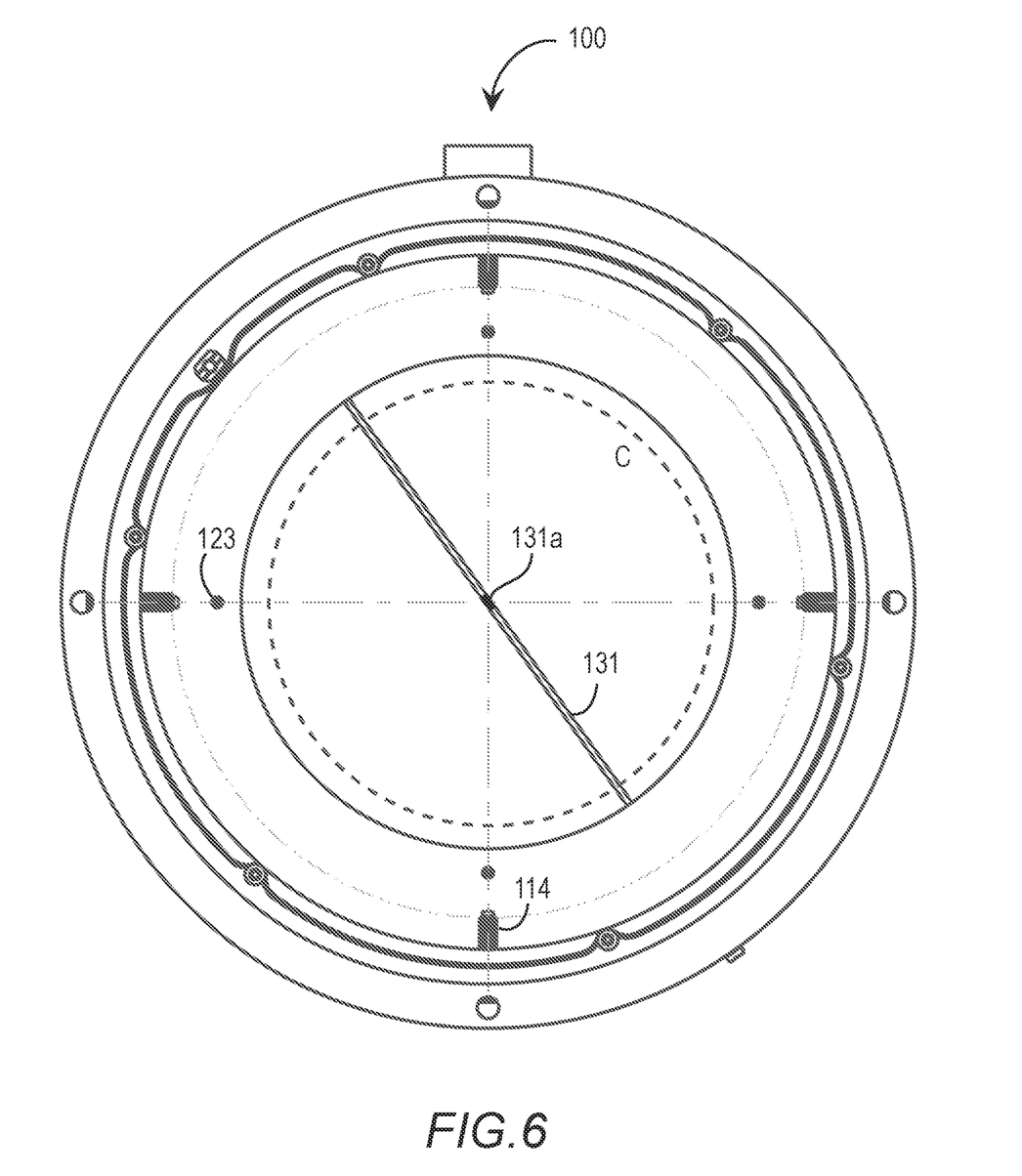
FIG. 6 is a plan view of a second side of the collar device, the second side is opposite the first side.

FIG. 6 shows a second side of the collar device 100, the second side being opposite the first side (FIG. 3). Viewable from the second side of the assembled collar device is radiolucent marker 131 having center marker 131a thereon. The center marker can comprise a void in the radiolucent marker, a halogenated polymer coating (iodine, etc.), or other variation as would be appreciated by one with skill in the art. The center marker identifies the center of the collar device. Also shown are mounting screws 114 for mounting the collar device to the image receptor, and first set-screws 123 for aligning the collar device about the image receptor.

Figure 7:
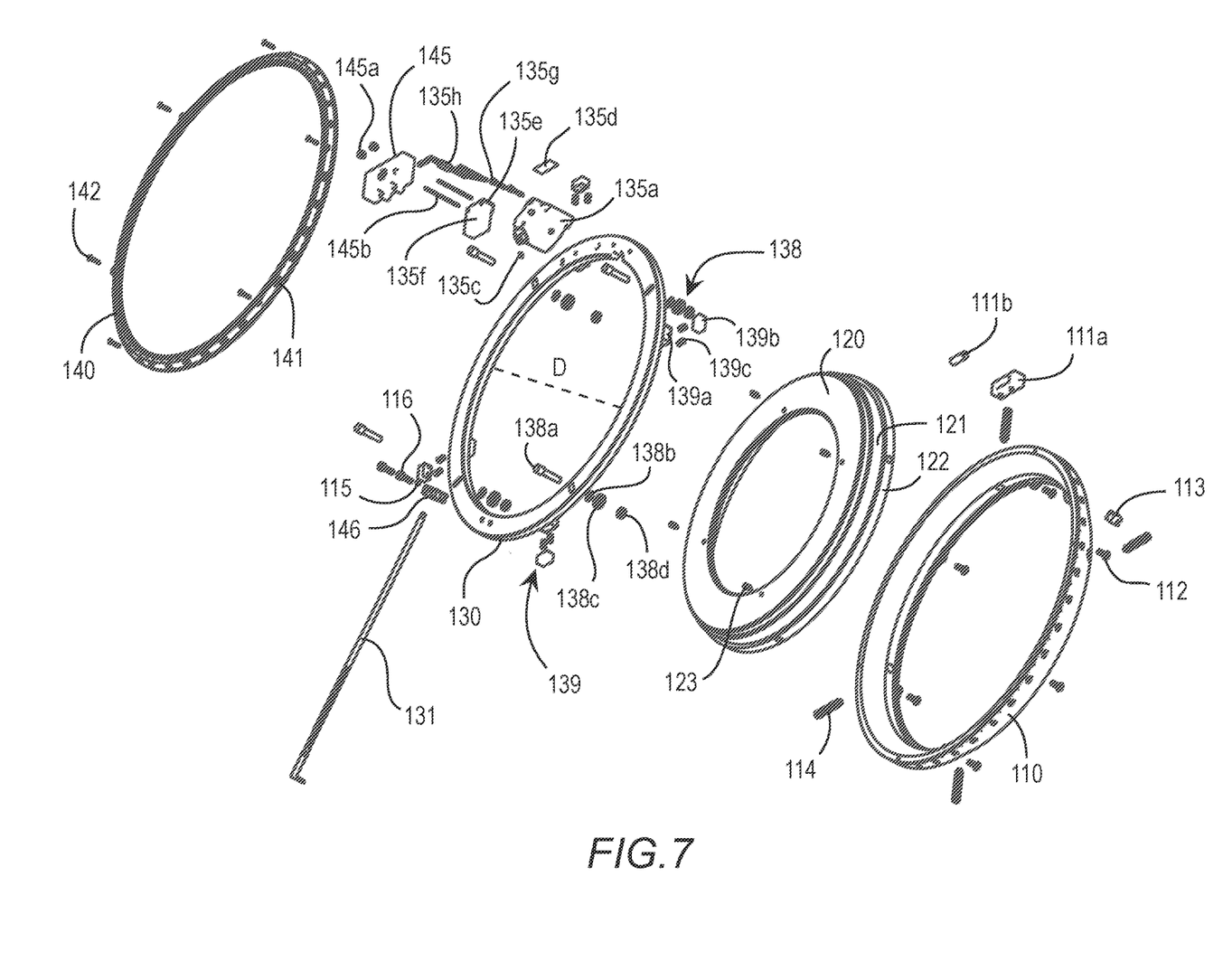
FIG. 7 is an exploded view of the collar device in the first illustrated embodiment.

FIG. 7 is an exploded view of the collar device as provided in the first illustrated embodiment. The collar device is shown comprising four primary sections, such as, housing 110; base 120; rotating assembly 130; and bezel 140.

The collar device includes housing 110. Bubble assembly 111 includes bubble level housing 111a and bubble level 111b as shown in the exploded view. In addition, the housing receives mounting screws 114 therein for attaching to the image receptor of the imaging system. Housing screws 112 are provided for attaching the housing to the base 120. Also shown is marker clip 113, which is used to secure the radiolucent marker 131 at the laser source housing 135a.

Base 120 comprises a channel 121 extending about a periphery 122 of the base. First set-screws 123 are provided for adjusting alignment of the collar device about a face of the image receptor. The base is adapted to attach to the housing 110 via the housing screws 112.

Rotating assembly 130 comprises bearing assemblies 138 and brake assemblies 139. Each of the bearing assemblies is provided to facilitate rotation of the rotating assembly about the base. The bearing assemblies are shown comprising a ball bearing screw 138a configured to extend through an aperture of the rotating assembly disc, and a washer 138b, bearing 138c, and nut 138d engaged with the bearing screw. The brake assemblies are shown comprising a brake receptacle 139a, brake springs 139c, and brakes 139b. The brake assemblies are configured to provide a biased force against the housing for controlling spin of the rotating assembly. It is important to be able to rotate the rotating assembly about the collar device, but to hold the rotating assembly in place one configured in the desired orientation.

Also attached to the rotating assembly is laser source assembly 135, which is made up of laser source housing 135a, laser source 135b disposed within the laser source housing, laser housing set screw 135c for adjusting the laser light emitted form the laser source, circuit backing 135d, circuit box 135e, and circuit board 135f. Laser mounting screws 135g are used to assemble the componentry of the laser source assembly 135. A JST PH or other connection wire ("connection wire 135h") is used to connect the laser source assembly to battery assembly 145. Battery pins 145b and battery locking screws 145a are used to assemble the battery assembly about the rotating assembly 130.

Finally, bezel 140 is adapted to attach to the collar device via bezel screws 142. Indicia 141 is shown disposed about a surface of the bezel.

Figure 8:
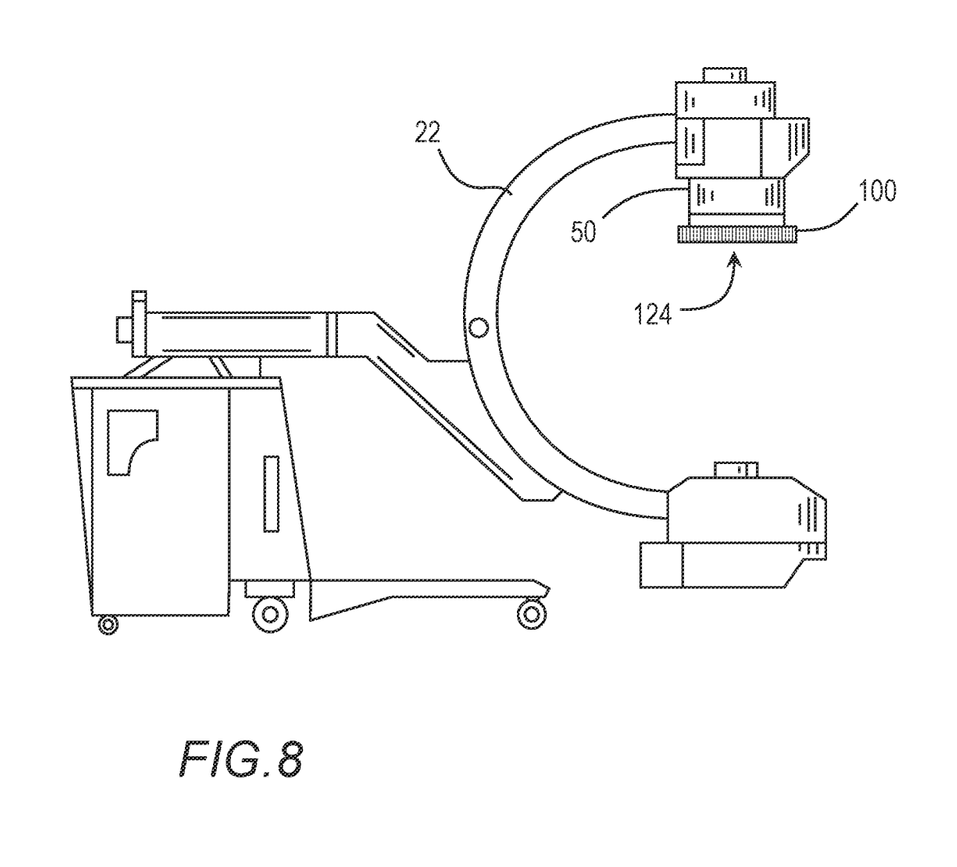
FIG. 8 is a plan view of a C-arm medical imaging system including the collar device attached to an image receptor of the medical imaging system.

FIG. 8 shows a C-arm medical imaging system including the collar device 100 attached to an image receptor 50 of the medical imaging system. The image receptor includes an image receptor face 124 at which the collar device is mounted. The C-arm 22 is provided for rotating the imaging system about a horizontal axis.

Figure 9:
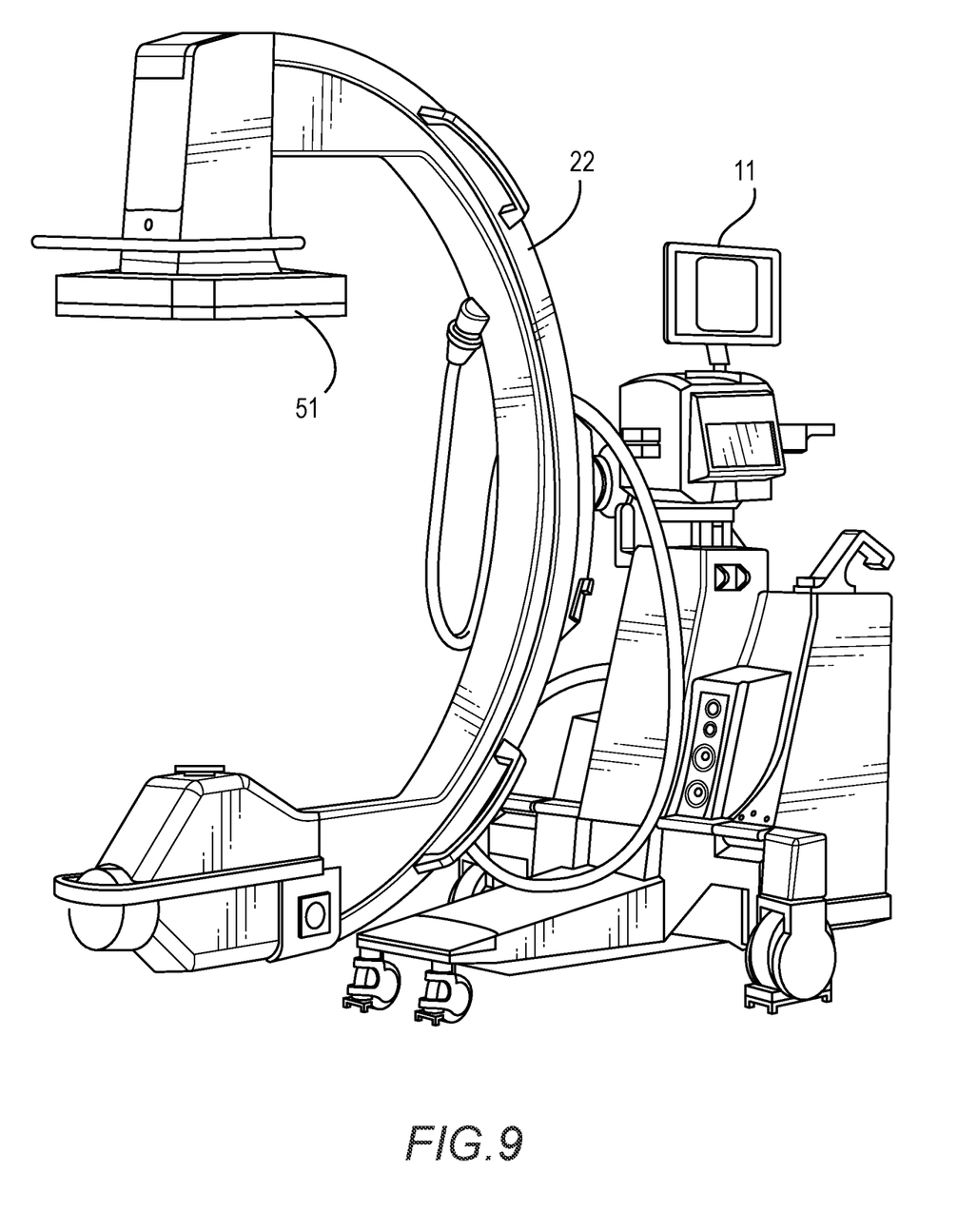
FIG. 9 shows a C-arm medical imaging system including a flat panel detector of the medical imaging system.

FIG. 9 shows a C-arm medical imaging system including a flat panel detector 51 of the medical imaging system. In this embodiment, the collar device can be designed to attach to the flat panel detector, for example, by changing a design of the base from a circular shape to a rectangular structure. Note that the term "annular" as used herein may apply to circular or rectangular ring-like structures.

Figure 10:
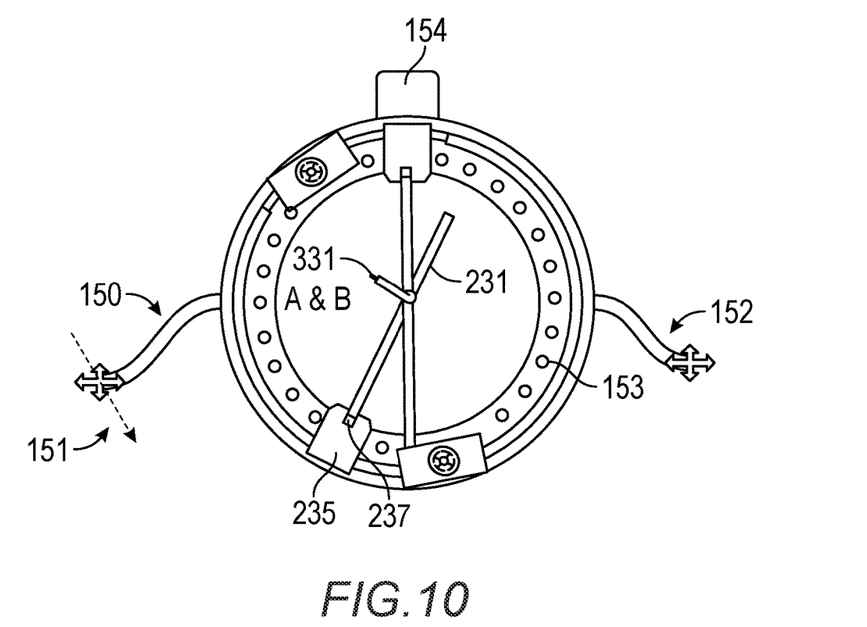
FIG. 10 shows a front view of the collar device (first side) in accordance with one embodiment.

FIG. 10 shows a front view of the collar device (first side) in accordance with one embodiment, the collar device including: a first radiolucent marker, and a second radiolucent marker 231 coupled to each of the first radiolucent marker, at a center thereof, and the periphery of the collar device. The second radiolucent marker may be selectively configured at an angle (A') with respect to the first radiolucent marker. At the periphery of the collar device is disposed an optional second laser source assembly 235, wherein the second radiolucent marker may be configured to align with the second laser source assembly for holding the second radiolucent marker colinear with respect to a second laser light plane 237 of the second laser source assembly. A proximal end of an optional third radiolucent marker 331 can be coupled to one or both of the first and second radiolucent markers and configured to rotate at the proximal end. For example, the third radiolucent marker may be coupled to the first and/or second radiolucent markers by a ball-bearing or similar mechanical component. In a preferred embodiment, the third radiolucent marker comprises two or more concentrically nested tubes for expandable configuration of a length associated with the third radiolucent marker. Light emitting diodes (LEDs) 153 are shown disposed about the periphery of the collar device and provide a source of light in a direction of a surgical site. A visual scope mount 154 for holding a microscope or other inspection scope can be implemented at an outer surface of the collar device as shown. In addition, a stationary arm attachment 150 can extend from an outer surface of the collar device toward the patient, wherein a patient-mounted rod 151 may be attached to the stationary arm attachment for securing the collar device in a position relative to the patient. A second stationary arm can be similarly implemented and configured to extend from the collar device for attaching a surgical instrument 152, wherein the surgical instrument may be securely held relative to a position of the collar device.

Figure 11:
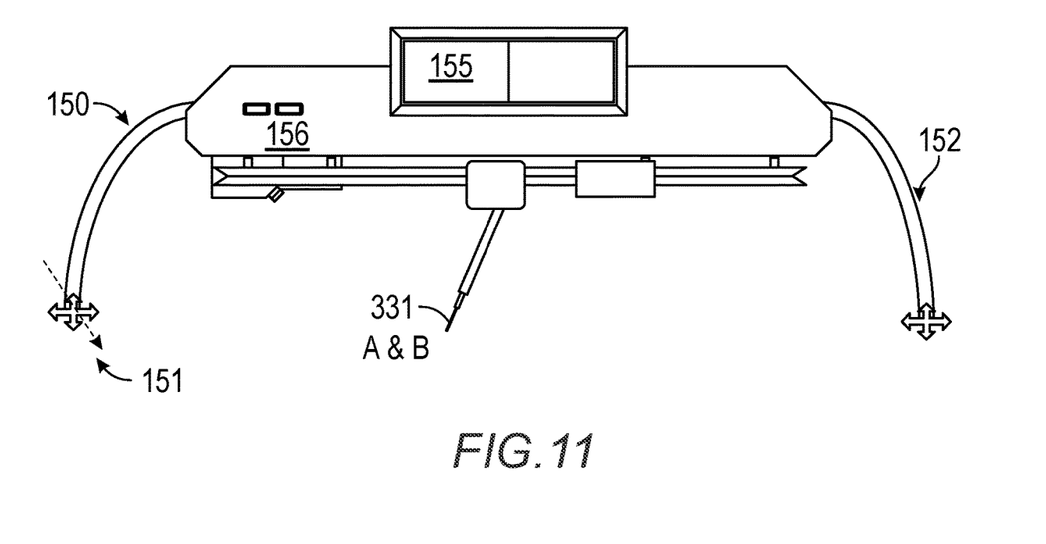
FIG. 11 shows a side view of the collar device in accordance with the embodiment of FIG. 10.

FIG. 11 shows a side view of the collar device in accordance with the embodiment of FIG. 10, the collar device further comprises: an optional display screen mount 155 configured to receive a display screen for use during a surgical procedure, and optional audio/visual componentry (a/v componentry) 156. The telescoping third radiolucent marker 331 is further illustrated from in this view to show possible configuration angles, wherein the third radiolucent marker is configurable about a hemispherical space relative to the collar device and a center thereof. In this regard, the hemispherical space may be defined by any radius up to the entire radius of the collar device, thereby providing numerous possible angles of configuration and radii for orienting the third radiolucent marker.

In some embodiments, the collar device may be implemented at the source side of the imaging system. For example, the collar device may be disposed at the emitter of an x-ray imaging system as opposed to the image receptor side.

In yet other embodiments, the collar device may be integrated into an imaging system. For example, the functional components of the collar device can be integrated in the image receptor side, or emitter side, of the medical imaging system, or somewhere positioned therebetween, and sharing a common housing and/or other componentry.

Other features can be provided in various embodiments for enhancing capabilities of the collar device.

While various details, features, combinations are described in the illustrated embodiments, one having skill in the art will appreciate a myriad of possible alternative combinations and arrangements of the features disclosed herein. As such, the descriptions are intended to be enabling only, and non-limiting. Instead, the spirit and scope of the invention, as intended by the Applicant, is set forth in the appended claims.

FEATURE DESCRIPTION x-ray imaging system (10)
monitor (11)
video camera (12)
optical coupling (13)
x-ray image intensifier (14)
grid (15)
patient (16)
table (17)
filtration (18)
collimator (19)
X-ray tube (20)
X-ray generator (21)
C-arm (22)
image receptor (50)
flat panel detector (51)
collar device (100)
housing (110)
bubble level assembly (111)
bubble level housing (111a)
bubble level (111b)
housing screws (112)
marker clip (113)
mounting screws (114)
marker set screw (115)
marker end screw (116)
base (120)
channel (121)
periphery (122)
first set-screws (123)
image receptor face (124)
rotating assembly (130)
radiolucent marker (131)
center marker (131a)
first end (132)
second end (133)
first and second fiducial markers (134a; 134b)
laser source assembly (135)
laser source housing (135a)
laser source (135b)
laser housing set screw (135c)
circuit backing (135d)
circuit box (135e)
circuit board (135f)
laser mounting screw (135g)
connection wire (135h)
laser light (136)
laser light plane (137)
bearing assemblies (138)
ball bearing screw (138a)
washer (138b)
bearing (138c)
bearing nut (138d)
brake assemblies (139)
brake receptacle (139a)
brake (139b)
brake springs (139c)
bezel (140)
indicia (141)
bezel screws (142)
battery assembly (145)
battery locking screws (145a)
battery pin (145b)
end rod holder (146)
stationary arm attachment (150)
patient-mounted rod (151)
surgical instrument (152)
light emitting diodes (153)
microscope mount (154)
display screen mount (155)
a/v-componentry (156)
second radiolucent marker (231)
second laser source assembly (235)
second laser light plane (237)

third radiolucent marker (331)
concentrically nested tubes (331a; 331b)
angle (A')
circumference (C)
diameter (D)
opposite ends (S1; S2)

What is claimed is:

1. A collar device (100) for mounting with an image receptor (50) of an x-ray imaging system (10), the collar device comprising:
   a housing (110) configured for mounting about said image receptor;
   a base (120) coupled to the housing, the base including a channel (121) extending along a periphery (122) of the base; and
   a rotating assembly (130) coupled to the base and configured to rotate about the channel;
   the rotating assembly further comprising:
      a radiolucent marker (131) extending from a first end (132) to a second end (133) along at least a portion of a diameter (D) of the rotating assembly,
      a second radiolucent marker (231) coupled to the rotating assembly, and
      a laser source assembly (135) coupled to the rotating assembly and configured to project laser light (136) within a laser light plane (137).

2. The collar device of claim 1, wherein the rotating assembly comprises a combination of the radiolucent marker and the laser source assembly, and wherein the radiolucent marker is commonly disposed within the laser light plane.

3. The collar device of claim 1, wherein the image receptor comprises one from the group consisting of: an x-ray image intensifier (14) and a flat panel detector (51).

4. The collar device of claim 1, further comprising a bezel (140), wherein at least one of: the bezel and the housing comprises indicia (141) disposed about an exterior surface thereof.

5. The collar device of claim 1, further comprising a bubble level assembly (111), the bubble level assembly being coupled to the housing.

6. The collar device of claim 1, wherein the base further comprises a plurality of first set-screws (123) for adjusting an orientation of the collar device about a face (124) of the image receptor.

7. The collar device of claim 1, wherein the rotating assembly further comprises one or more bearing assemblies (138), each of said bearing assemblies being disposed about a circumference (C) of the rotating assembly and being configured to rotatably engage the channel of the base.

8. The collar device of claim 7, wherein each of said bearing assemblies individually comprises: a ball bearing screw (138a), a washer (138b), a bearing (138c), and a bearing nut (138d).

9. The collar device of claim 1, wherein the rotating assembly further comprises one or more brake assemblies (139), each of the one or more brake assemblies being independently configured to apply frictional resistance to an inner surface of the housing.

10. The collar device of claim 9, wherein each of said brake assemblies comprises: a brake receptacle (139a), a brake (139b), and one or more brake springs (139c) configured to extend between the brake receptacle and the brake for providing a bias-force therebetween.

11. The collar device of claim 1, wherein said laser source assembly comprises a laser source housing (135a) and a laser source (135b) disposed within the laser source housing.

12. The collar device of claim 11, wherein said laser source assembly is further coupled to a battery assembly (145).

13. The collar device of claim 1, wherein the first end of the radiolucent marker is coupled to the rotating assembly via an end rod holder (146).

14. The collar device of claim 13, wherein the second end of the radiolucent marker is attached to the laser source assembly.

15. The collar device of claim 1, the rotating assembly further comprising first and second fiducial markers (134a; 134b) each disposed at opposite ends (S1; S2) of the collar device.

16. The collar device of claim 1, wherein the second radiolucent marker is configured at an angle (A') with respect to the first radiolucent marker, wherein the angle comprises between 1° and 90°.

17. The collar device of claim 1, further comprising a second laser source assembly (235) coupled to the rotating assembly.

18. The collar device of claim 17, wherein the second laser source assembly is configured to project laser light within a second laser light plane (237) distinct from the other laser light plane, and wherein the second radiolucent marker is configured in alignment with the second laser light plane.

19. The collar device of claim 1, further comprising a third radiolucent marker (331), the third radiolucent marker coupled to the first radiolucent marker at a center thereof, the third radiolucent marker comprising concentrically nested tubes (331a; 331b).

20. The collar device of claim 1, further comprising a stationary arm attachment (150) for securing a position of the collar system relative to a patient-mounted rod (151), surgical instrument (152), or a combination thereof.

21. The collar device of claim 1, the radiolucent marker further comprising a center marker (131a), wherein the center marker is disposed along the radiolucent marker at a center of the collar device.

22. The collar device of claim 1, further comprising a plurality of light emitting diodes (153) each disposed about a periphery of the collar device.

23. The collar device of claim 1, further comprising a microscope mount (154) for attaching a microscope to the collar device.

24. The collar device of claim 1, further comprising a display screen mount (155) for attaching a display screen to the collar device.

25. The collar device of claim 24, further comprising a/v-componentry (156) for communicating audio signals, visual signals, or a combination thereof.

26. A collar device for use with a medical imaging system, the collar device comprising:
   a base configured to couple with a portion of the medical imaging system;
   a rotating assembly being rotatably coupled to the base;
   the rotating assembly further comprising:
      a radiolucent marker (131) extending from a first end (132) to a second end (133) along at least a portion of a diameter (D) of the rotating assembly,
      a second radiolucent marker (231) coupled to the rotating assembly,
      first and second fiducial markers (134a; 134b) each disposed at opposite ends (S1; S2) of the collar device, and
      a laser source assembly (135) coupled to the rotating assembly and configured to project laser light (136) within a laser light plane (137).

27. The collar device of claim 26, wherein the radiolucent marker is commonly disposed within the laser light plane.

28. The collar device of claim 26, comprising two or more radiolucent markers.

29. The collar device of claim 26, comprising two or more laser source assemblies.

30. A collar device (100) for mounting with an image receptor (50) of an imaging system (10), the collar device comprising:
- a housing (110) configured for mounting about said image receptor;
- a base (120) coupled to the housing, the base including a channel (121) extending along a periphery (122) of the base; and
- a rotating assembly (130) coupled to the base and configured to rotate about the channel;
- the rotating assembly further comprising:
  - a radiolucent marker (131) extending from a first end (132) to a second end (133) along at least a portion of a diameter (D) of the rotating assembly,
  - a second radiolucent marker (231) coupled to the rotating assembly,
  - first and second fiducial markers (134*a*; 134*b*) each disposed at opposite ends (S1; S2) of the collar device, and
  - a laser source assembly (135) coupled to the rotating assembly and configured to project laser light (136) within a laser light plane (137).

* * * * *